(12) United States Patent
Van Vooren et al.

(10) Patent No.: US 9,992,934 B2
(45) Date of Patent: Jun. 12, 2018

(54) AGRICULTURAL MACHINE EQUIPPED WITH CAM MECHANISM FOR GATHERING CROP MATERIAL

(71) Applicant: CNH Industrial America LLC, New Holland, PA (US)

(72) Inventors: Sandor Van Vooren, Sijsele-Damme (BE); Siegfried Vandergucht, Reninge (BE)

(73) Assignee: CNH Industrial America LLC, New Holland, PA (US)

( * ) Notice: Subject to any disclaimer, the term of this patent is extended or adjusted under 35 U.S.C. 154(b) by 20 days.

(21) Appl. No.: 15/058,648

(22) Filed: Mar. 2, 2016

(65) Prior Publication Data

US 2016/0255774 A1    Sep. 8, 2016

(30) Foreign Application Priority Data

Mar. 6, 2015    (BE) .................................... 2015/5122

(51) Int. Cl.
| | |
|---|---|
| *A01D 43/02* | (2006.01) |
| *A01D 89/00* | (2006.01) |
| *A01D 61/00* | (2006.01) |
| *A01D 57/00* | (2006.01) |
| *A01D 101/00* | (2006.01) |

(52) U.S. Cl.
CPC ........... *A01D 61/008* (2013.01); *A01D 57/00* (2013.01); *A01D 89/002* (2013.01); *A01D 2101/00* (2013.01)

(58) Field of Classification Search
CPC .... A01D 57/03; A01D 61/008; A01D 89/002; A01D 57/02; A01D 89/008; A01D 41/14; A01D 61/002; A01D 89/00
USPC .................................................... 56/130, 364
See application file for complete search history.

(56) References Cited

U.S. PATENT DOCUMENTS

| | | | |
|---|---|---|---|
| 3,236,038 A | 2/1966 | Gates et al. | |
| 3,358,429 A | 12/1967 | Claas | |
| 3,389,821 A * | 6/1968 | Weichel ................. | A01D 90/02 198/498 |
| 3,472,008 A * | 10/1969 | Hurlburt ................ | A01D 57/03 56/1 |
| 3,545,185 A * | 12/1970 | Dorsett .................. | A01D 29/00 56/14.6 |

(Continued)

FOREIGN PATENT DOCUMENTS

| | | |
|---|---|---|
| FR | 1083316 A | 1/1955 |
| FR | 1270287 A | 8/1961 |

(Continued)

*Primary Examiner* — Arpad Fabian-Kovacs
(74) *Attorney, Agent, or Firm* — Patrick M. Sheldrake

(57) ABSTRACT

An agricultural machine with a mechanism involving rotating fingers for gathering crops towards an entry port, such as a rotating auger tube, has fingers mounted to be rotatable about a shaft that is itself movable inside the rotating tube, as the ends of the shaft are supported by a pair of cams. The ends of the shaft are movable along cam tracks which impose movement of the shaft along a pre-defined trajectory. Through a suitable coupling mechanism, the rotation of the tube drives the movement of the shaft ends in the cam tracks and hence the movement of the shaft itself, while the shaft remains parallel to the tube's rotation axis.

7 Claims, 3 Drawing Sheets

(56) References Cited

U.S. PATENT DOCUMENTS

| | | | | |
|---|---|---|---|---|
| 3,751,888 A * | 8/1973 | James | A01D 57/03 | 56/12.4 |
| 3,754,383 A * | 8/1973 | Burrough | A01D 43/107 | 280/43 |
| 3,940,910 A * | 3/1976 | d'Acremont | A01D 43/10 | 56/14.4 |
| 3,983,683 A * | 10/1976 | James | A01D 89/00 | 56/364 |
| 4,161,859 A * | 7/1979 | Storm | A01D 89/002 | 56/364 |
| 4,297,833 A * | 11/1981 | Gaeddert | A01D 89/002 | 56/364 |
| 4,539,801 A * | 9/1985 | Field | A01D 61/008 | 198/613 |
| 4,597,252 A * | 7/1986 | Williames | A01D 45/00 | 56/13.1 |
| 4,928,462 A * | 5/1990 | Lippens | A01F 15/101 | 100/142 |
| 5,007,235 A * | 4/1991 | Nickel | A01D 57/03 | 384/281 |
| 5,359,839 A * | 11/1994 | Parsons | A01D 57/03 | 460/122 |
| 5,595,053 A * | 1/1997 | Jasper | A01D 57/02 | 56/226 |
| 5,620,083 A * | 4/1997 | Vogelgesang | A01D 61/008 | 198/613 |
| 5,848,523 A * | 12/1998 | Engel | A01F 15/106 | 100/88 |
| 5,987,861 A * | 11/1999 | Duncan | A01D 57/03 | 460/142 |
| 6,279,304 B1 * | 8/2001 | Anstey | A01D 89/008 | 198/676 |
| 6,502,379 B1 * | 1/2003 | Snider | A01D 57/02 | 56/221 |
| 7,392,646 B2 * | 7/2008 | Patterson | A01D 61/008 | 198/613 |
| 8,156,723 B1 * | 4/2012 | McClure | A01D 89/002 | 56/341 |
| 8,240,117 B1 * | 8/2012 | McClure | A01D 89/008 | 56/341 |
| 8,590,284 B2 * | 11/2013 | Rayfield | A01D 57/03 | 56/226 |
| 9,038,358 B2 * | 5/2015 | Landon | A01D 57/28 | 56/192 |
| 9,392,747 B2 * | 7/2016 | Patterson | A01D 61/008 | |
| 2009/0056298 A1 | 3/2009 | Lohrentz et al. | | |
| 2010/0212277 A1 * | 8/2010 | Marrs | A01D 61/004 | 56/12.4 |
| 2015/0208582 A1 * | 7/2015 | Patterson | A01D 61/008 | 460/20 |
| 2015/0272003 A1 * | 10/2015 | Honey | A01D 57/025 | 56/181 |
| 2015/0313081 A1 * | 11/2015 | Jost | A01D 57/03 | 56/17.3 |

FOREIGN PATENT DOCUMENTS

| | | | | |
|---|---|---|---|---|
| FR | | 1422690 A | 12/1965 | |
| GB | | 919870 A | 2/1963 | |
| WO | WO8706793 A | * | 11/1987 | A01D 84/00 |

* cited by examiner

AGRICULTURAL MACHINE EQUIPPED WITH CAM MECHANISM FOR GATHERING CROP MATERIAL

This application claims priority to Belgium Application BE2015/5122 filed Mar. 6, 2015, which is incorporated herein by reference in its entirety.

FIELD OF THE INVENTION

The present invention is related to agricultural machines such as combine harvesters or balers, equipped with rotating fingers for moving crops towards an entry port of the machine.

BACKGROUND OF THE INVENTION

A known type of header of a combine harvester comprises an auger for moving harvested crops from the lateral portions of the header towards the central area of the header where the crops are supplied to the entry port of the combine's feeder. The auger has a cylindrical body extending essentially along the full width of the header and provided with oppositely wound helical blades on both sides of the central area, so as to push the crops towards said central area. The auger is additionally provided with auger fingers configured to support the crops during their movement along the auger's longitudinal direction. In the central area especially, the auger fingers are important for guiding the crops effectively towards the entry port of the combine's inlet feeder. Similar auger systems are used in balers configured for gathering hay from the ground and forming rectangular or cylindrical bales.

The mechanism that is commonly in use in present day combines employs a hollow rotating tube with the helical blades attached to the outer surface, and auger fingers which are configured to rotate about a fixed time shaft that is itself eccentrically placed with respect to the tube's rotation axis. Usually the central auger fingers rotate about a time shaft that is distinct from the laterally placed time shafts of the lateral auger fingers. The location of the central time shaft is chosen so that the central auger fingers extend furthest out of the tube at the front of the auger, so as to support a load of crops during its movement towards the area underneath the auger tube and hence towards the feeder, and retract into the tube at the back side of the auger tube, thereby enabling the delivery of the crops into the feeder's entry port. As the fingers rotate about a fixed shaft, there is an inevitable dead zone where the crops are not supported by the auger fingers. As the size of combines and thus of the auger mechanisms increases, this dead zone equally increases in size, leading to an unacceptable decline in terms of the consistency of the crop delivery.

SUMMARY OF THE INVENTION

The invention is related to an agricultural machine as described in the appended claims. The present invention is thus related to a machine provided with a mechanism involving rotating fingers for gathering crops towards an entry port. One embodiment is a combine harvester provided with a header equipped with a rotating auger tube for transporting crops towards the central area of the header from where rotating fingers guide the crops towards the entry port of the combine's feeder. According to the invention, the fingers are mounted to be rotatable about a shaft that is itself movable inside the rotating tube, as the ends of the shaft are supported by a pair of stationary cams, i.e. the cams are stationary inside the tube when the tube rotates. The ends of the shaft are movable along cam tracks which impose movement of the shaft along a pre-defined trajectory. Through a suitable coupling mechanism, the rotation of the tube drives the movement of the shaft ends in the cam tracks and hence the movement of the shaft itself, while the shaft remains parallel to the tube's rotation axis. For example, the shaft may extend through slits provided in discs that rotate together with the tube. By judicially designing the cam tracks, the operation of the auger fingers may be adapted and optimized. The dead zone problem of prior art systems can be mitigated by designing the cam tracks appropriately, as will be described hereafter in more detail.

DETAILED DESCRIPTION OF THE INVENTION

Preferred embodiments will now be described with reference to the drawings. The detailed description is not limiting the scope of the invention, which is defined only by the appended claims.

Figure 1:
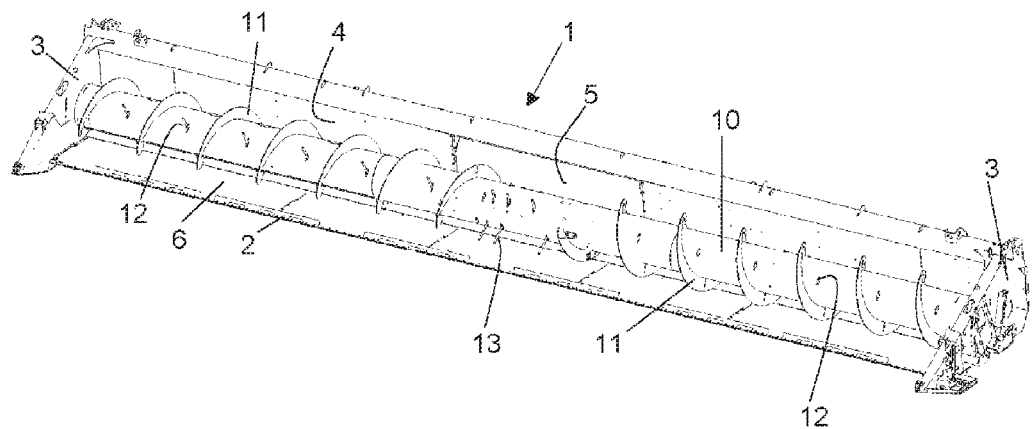
FIG. 1 is a view of a combine header as presently known in the art.

The above-referenced auger finger mechanism applied in the central area of many of today's combine headers is first described in more detail. FIG. 1 is a view of a combine header 1 as generally known in the art. The header comprises a cutter bar 2 mounted between side walls 3, a back wall 4 with the entry port 5 towards the feeder (not shown), and a header floor 6. The auger tube 10 as described above is visible, provided with the helical blades 11, side auger fingers 12 and central auger fingers 13.

Figure 2:
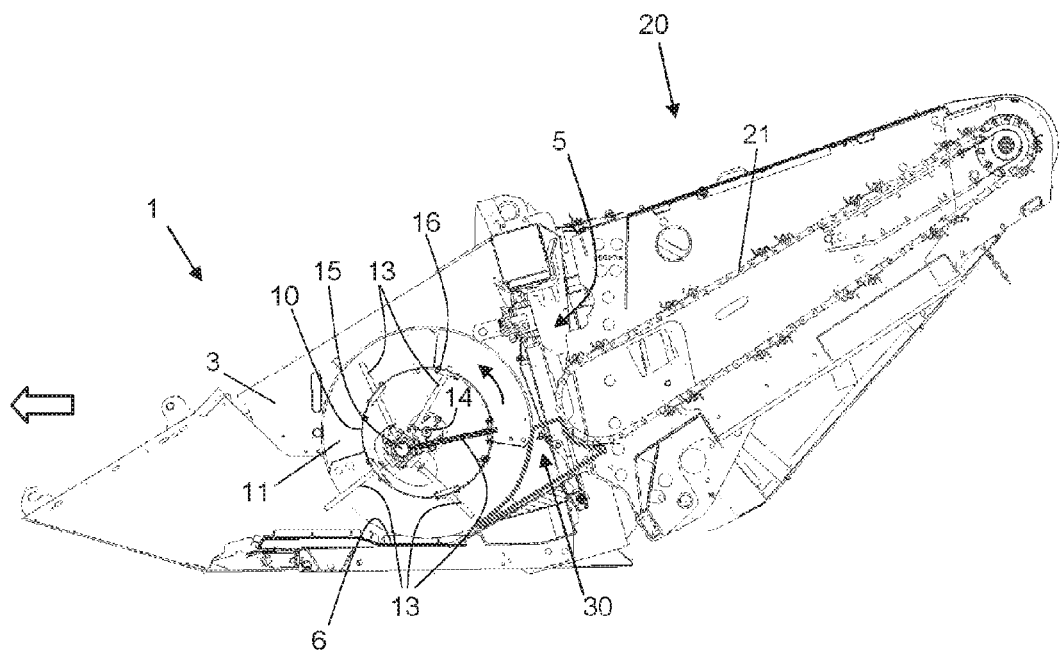
FIG. 2 illustrates the most commonly used prior art auger system of a combine header, and shows the position of the disadvantageous dead zone.

FIG. 2 shows a sectioned side view of this mechanism with the section applied through the middle of the header. FIG. 2 also shows a feeder 20 to which the header 1 is attached. The feeder is equipped with a moving chain system 21 for transporting crops from the feeder's entry port 5 towards the threshing rotors and the grain cleaning section of the combine (not shown). The arrow indicates the drive direction which also defines the front and back sides of the header 1. The auger tube 10 is rotatable about its symmetry axis 14, and driven by a laterally placed drive mechanism as generally known in the art. The central auger fingers 13 are rotatable about a fixed eccentrically placed time shaft 15, placed closer to the front of the auger tube 10 than to the back. The fingers 13 extend through openings 16 in the tube. The rotation of the tube in the indicated direction causes the fingers to be rotated about the fixed shaft 15 whilst extending out of and retracting into the tube 10 during one revolution of the auger tube, as a consequence of the eccentric position of the shaft 15. At the front side of the tube, a large part of the fingers extends out of the tube 10, to thereby guide crop material towards the area between the tube 10 and the header floor 6. From there, the crops are propelled into the entry port 5 of the feeder 20. At the back side of the tube 10, the fingers retract into the tube so as to avoid transporting the crops back towards the front. The above-described dead zone 30 at the lower back side of the tube 10 is illustrated in FIG. 2. In this area, the crops are no longer supported by the auger fingers. Especially when the dead zone becomes large, this may lead to accumulation of crops in the dead zone which may in turn lead to unacceptable back feeding problems or inadequate feeding of the crop to the feeder.

Figure 3:
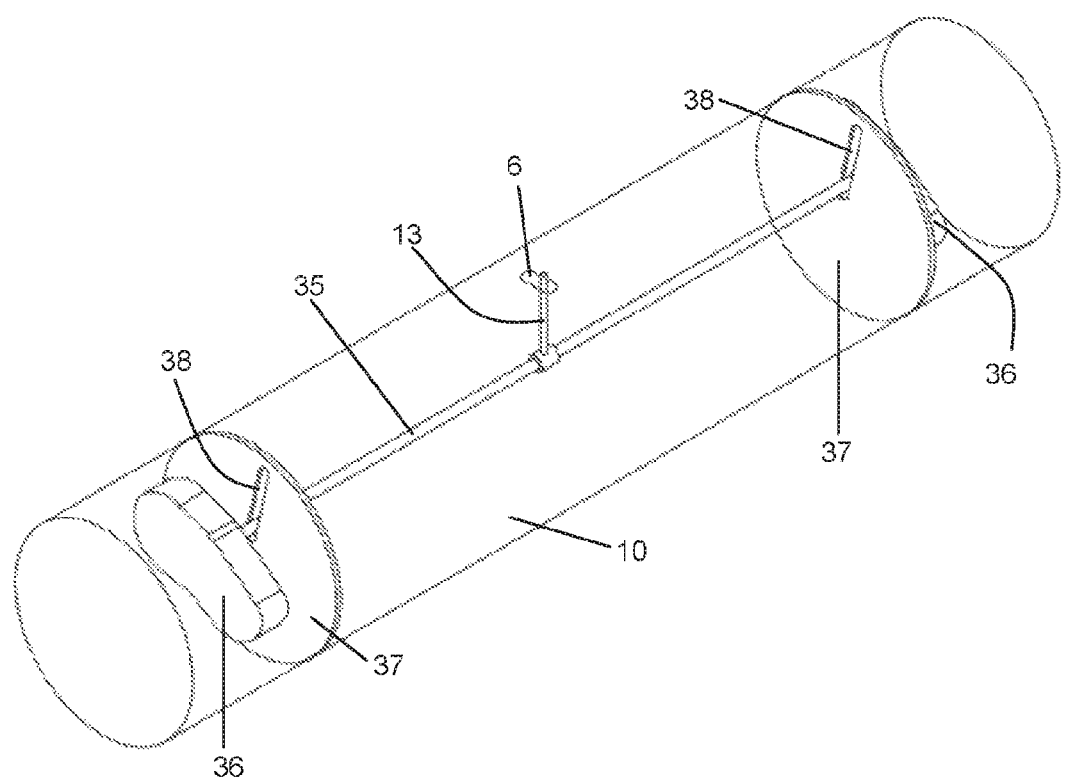
FIG. 3 illustrates an auger finger mechanism according to the invention.

FIG. 3 is a 3D view of an auger finger mechanism according to a preferred embodiment of the invention. Only the central area of the auger tube 10 is shown, with only one central auger finger 13 being depicted for the sake of clarity. The finger 13 extends through an opening 16 in the tube wall as in the prior art system. The finger is rotatable with respect to a shaft 35, which is itself movable whilst staying parallel to the longitudinal axis of the tube 10. This is achieved through a pair of equal-shaped but mirrored cams 36 which are in a fixed position, i.e. the cams remain stationary with respect to the rotating auger tube 10. The cams are mirrored with respect to the vertical symmetry plane of the auger tube 10. The cams 36 support the ends of the movable shaft 35 whilst forcing these ends to move along a pre-defined path defined by cam tracks provided on the inner surface of the cams.

Two discs 37 are furthermore mounted inside the auger tube 10, in the vicinity of the cams 36. The discs are attached, preferably welded, to the interior of the tube, i.e. the discs 37 rotate together with the tube. Each disc is provided with a radial slit 38, through which the movable shaft 35 extends in a manner so that the shaft is capable of moving in a one-dimensional radial direction with respect to the discs 37.

Figure 4:
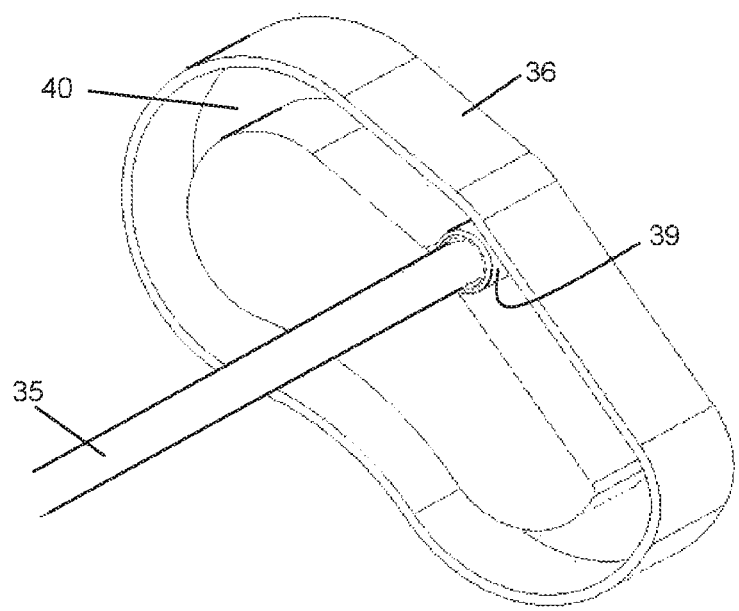
FIG. 4 shows a detail of the cam track used in a preferred embodiment of the invention.

FIG. 4 shows a detail of one end of the movable shaft 35, said end being rotatably mounted in a cam track bearing 39 that is itself movable in the cam track 40.

Figure 5:
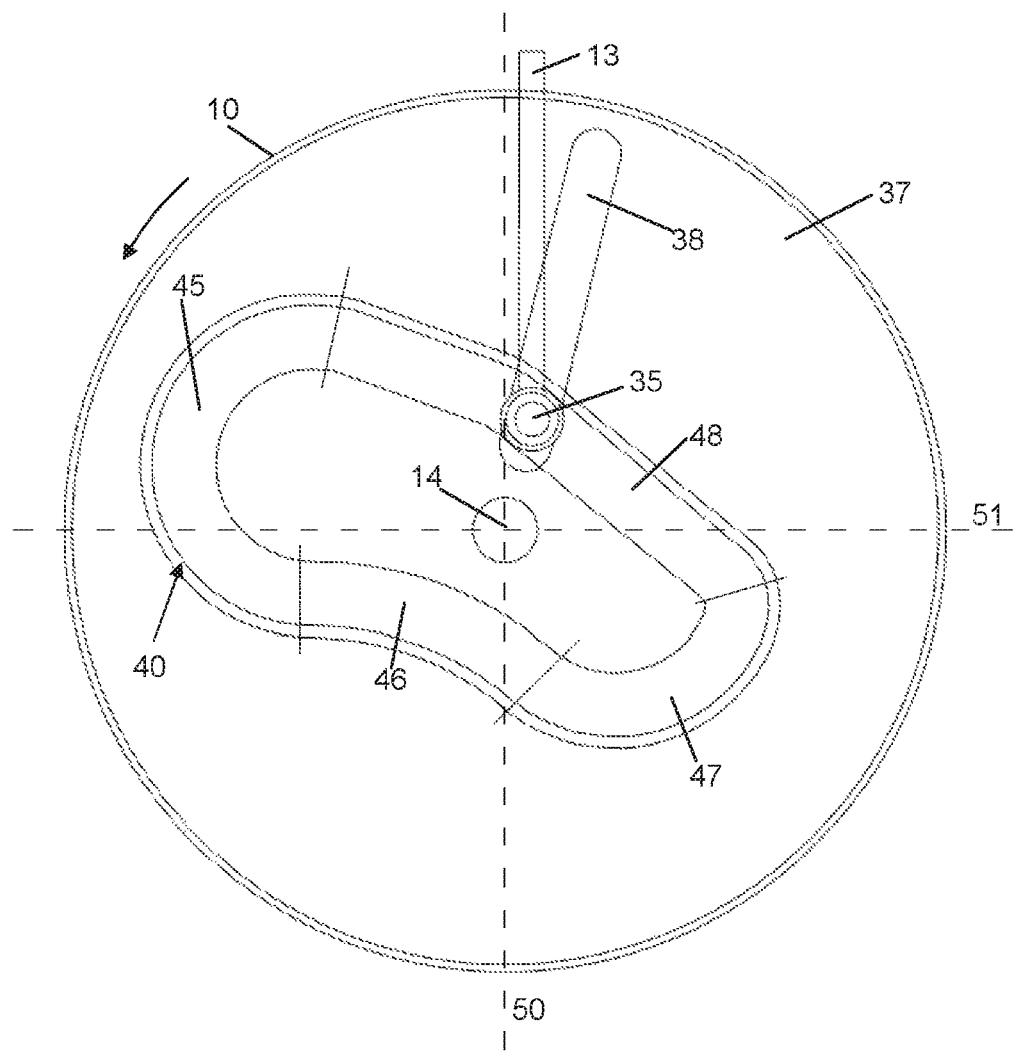
FIG. 5 shows the various portions of the cam track according to a preferred embodiment.

When the auger tube 10 rotates, the discs 37 exert a force on the movable shaft 35 which is forced to move along the path defined by the cam tracks 40. The shape of the cam tracks defines the movement of the auger fingers 13 with respect to the auger tube 10. FIG. 5 shows a side view of the cam 36, the disc 37 and the auger finger 13, with the finger retracted inside the tube. Starting from this position, one revolution of the auger tube 10 will now be described, on the basis of four consecutive track portions 45 through 47 of the cam track 40. The four portions are separated by dotted lines in FIG. 5. When the auger tube rotates in the direction indicated by the arrow, the movable shaft 35 is forced to follow the first portion 45 of the cam track at the front of the tube 10, which causes the finger to be extracted from the tube, to thereby guide a load of crops towards the area between the auger tube 10 and the header floor 6. In the second portion 46 of the cam track, the finger is retracted to avoid a collision with the floor, but in the following portion 47 of the track, the finger is again extracted. The third portion 47 is located at least partially at the lower back side of the tube (i.e. in the quarter of the tube's cross-section lying between the vertical symmetry axis 50 and the back half of the meridian 51). This third portion 47 corresponds substantially to the area referred to as the 'dead zone' in the prior art mechanism of FIG. 2. The cam track 40 forces the fingers to be extended further outwards from the auger tube in this area compared to the prior art system, and thereby ensures a better support of the crops in the 'dead zone'. In the following cam track portion 48, the movable shaft 35 is maintained close to the centre of the tube, i.e. the fingers are retracted into the tube, until the tube finishes its rotation and the cycle can start again.

The relatively sharp transition between areas 47 and 48 of the cam track ensures a fast retracting of the finger 13 once it passes the 'dead zone', thereby facilitating the effective delivery of the crops to the entry port 5 of the combine's feeder. The invention is however not limited to the cam track shape shown in the drawings. Any cam track shape can be designed, possibly answering to other problems besides the 'dead zone' issue. By optimizing the shape of the cam tracks, or adapting it to various crop types, the feeding of the crops to the combine can thus be optimized.

According to a preferred embodiment of a combine according to the invention, the cams 36 are mounted on the fixed time shafts of the side auger fingers 12 shown in FIG. 1. The side auger fingers 12 are guiding the crops in the side areas of the auger located on both sides of the central area, in which side areas the crops are being transported by the helical blades 11 towards the central area. In the preferred embodiment, the side auger fingers 12 function as in the mechanism shown in FIG. 2, i.e. they rotate about a fixed eccentrically placed shaft 15. The cams 36 may then be mounted at the ends of the respective fixed shafts on either side of the central area.

According to an embodiment, not only the central auger fingers 13 are mounted on a shaft that is movable along a set of cam tracks, but also the side auger fingers 12 are mounted in the same way, each side auger shaft being movable in a dedicated pair of stationary cams.

According to still another embodiment, all the auger fingers, central (13) and side auger fingers (12) are rotatably mounted on the same movable shaft, configured to move in a pair of cam tracks as described above.

The discs 37 provided with slits 38 are a preferred example of a coupling means between the tube 10 and the fingers 13, configured to make the rotation of the tube drive the cam track-defined movement of the shaft 35 with respect to the tube. However other coupling means could be imagined, such as a pair of guides mounted inside the tube at a mutual distance corresponding to the diameter of the shaft, and between which the shaft is mounted.

The invention is related to a combine harvester equipped with the above-described auger mechanism, and to a combine header equipped with such a mechanism. The invention is however not only related to combine harvesters, but it is equally related to any agricultural machine, such as round or rectangular balers, comprising a rotating tube with rotating fingers extending from the tube.

The invention claimed is:

1. A crop guiding mechanism for an agricultural machine, the crop guiding mechanism comprising:
   a cylindrical tube rotatably coupled to a frame for rotation about a central axis of the tube;
   a plurality of fingers rotatable about a shaft located inside the tube, the shaft being parallel to the central axis of the tube, the fingers protruding through openings in the tube, the shaft having two shaft ends;
   first and second cam tracks, wherein the shaft ends are configured to move along said cam tracks, resulting in a movement of the shaft, wherein the first and second cam tracks extend around the central axis of the tube;
   a coupling between the shaft and the tube configured so that the movement of the shaft is driven by the rotation of the tube; and
   wherein the coupling comprises a set of discs attached to the interior of the tube for movement therewith with respect to the first and second cam tracks, each disc comprising a slit through which the shaft extends.

2. The crop guiding mechanism according to claim 1, wherein the slits provided in the discs are radially oriented with respect to the tube.

3. The crop guiding mechanism according to claim 1, wherein each of the cam tracks consist of four portions positioned consecutively in the rotation direction of the tube: a first portion at the front side of the tube, a second portion, a third portion at least partially at the lower back side of the tube, and a fourth portion at least partially at the upper side of the tube, wherein:
   during passage of the shaft ends through a majority of the first portion the fingers are predominantly extending outwards with respect to the tube,
   during passage of the shaft ends through a majority of the second portion, the fingers are predominantly retracted inside the tube,
   during passage of the shaft ends through a majority of the third portion, the fingers are again predominantly extending outwards with respect to the tube,
   during passage of the shaft ends through a majority of the fourth portion, the finger are predominantly retracted inside the tube.

4. The crop guiding mechanism according to claim 1, wherein said tube is a rotatable auger tube, the auger tube being provided with a pair of mutually opposed helical blades mounted on side areas of the auger tube, the helical blades being configured to transport crops from the side areas to a central area of the auger tube,
   said plurality of fingers are located at least in the central area of the auger tube, where the fingers are configured to supply crop material towards an entry port of a feeder of a combine harvester when the crop guiding mechanism is attached.

5. The crop guiding mechanism according to claim 4, wherein
   said plurality of fingers are located in the central area,
   said first and second cam tracks are mounted on either side of the central area,
   the crop guiding mechanism further comprises side auger fingers located in the side areas, the side auger fingers being rotatable about a pair of fixed eccentrically placed shafts, one shaft in each side area.

6. The crop guiding mechanism according to claim 4, wherein:
   said plurality of fingers are located in the central area,
   said first and second cam tracks are mounted on either side of the central area,
   the crop guiding mechanism further comprises side auger fingers located in the side areas.

7. The cropping guiding mechanism according to claim 4 in combination with an agricultural header;
   wherein the crop guiding mechanism is mounted to a frame of the header.

* * * * *